United States Patent

Loppoli et al.

Patent Number: 5,356,054
Date of Patent: Oct. 18, 1994

[54] WAGON WITH CUTTING, MIXING AND DISPENSING FUNCTIONS FOR FODDER AND GRASS OR STRAW MATERIALS STORED IN SILOS

[75] Inventors: Giuseppe Loppoli, Grantorto; Lino Zago, Campo San Martino, both of Italy

[73] Assignee: Seko Spa, Curtarolo (PD), Italy

[21] Appl. No.: 94,074

[22] PCT Filed: Dec. 27, 1991

[86] PCT No.: PCT/EP91/02510

§ 371 Date: Jul. 28, 1993

§ 102(e) Date: Jul. 28, 1993

[87] PCT Pub. No.: WO93/00799

PCT Pub. Date: Jan. 21, 1993

[30] Foreign Application Priority Data

Jul. 2, 1991 [IT] Italy .................. VI91 A/000108

[51] Int. Cl.⁵ .................. A01K 5/00; A01C 3/06
[52] U.S. Cl. .................. 222/610; 222/412; 366/603; 241/101.7; 241/236
[58] Field of Search .............. 222/610, 623, 271, 272, 222/412; 366/297, 298, 299, 603; 241/101.7, 236, 260.1; 239/615; 198/666, 669, 676

[56] References Cited

U.S. PATENT DOCUMENTS

| | | | |
|---|---|---|---|
| 3,173,693 | 3/1965 | Skromme | 239/675 X |
| 3,244,271 | 4/1966 | Wenning | 198/669 |
| 3,430,822 | 3/1969 | Lienemann et al. | 222/412 |
| 3,797,807 | 3/1974 | Behrens | 366/298 X |
| 4,597,510 | 7/1986 | Durant | 222/412 X |
| 4,619,381 | 10/1986 | Wurtz | 222/412 X |
| 4,720,047 | 1/1988 | Knight | 239/675 |
| 4,773,600 | 9/1988 | Metski | 241/101.7 |
| 4,804,111 | 2/1989 | Ricciardi et al. | 222/412 X |
| 5,148,999 | 9/1992 | Curfman et al. | 366/603 X |

FOREIGN PATENT DOCUMENTS

| | | |
|---|---|---|
| 0352670 | 1/1990 | European Pat. Off. . |
| 0385353 | 9/1990 | European Pat. Off. . |
| 3432725 | 3/1986 | Fed. Rep. of Germany ... 241/101.7 |
| 0214669 | 8/1989 | Japan .................. 241/101.7 |

*Primary Examiner*—Andres Kashnikow
*Assistant Examiner*—Anthoula Pomrening
*Attorney, Agent, or Firm*—Watson, Cole, Grindle & Watson

[57] ABSTRACT

The invention concerns a wagon for cutting, mixing and dispensing fodder. At least two rotating endless screws are housed within a curved-profile compartment. The screws have spirals wound in opposite directions to one another, so that the processed material is led to the center of the compartment. Each of the endless screws has at least one baffle plate extending radially of the endless screw; and the spirals have protruding blades.

10 Claims, 4 Drawing Sheets

WAGON WITH CUTTING, MIXING AND DISPENSING FUNCTIONS FOR FODDER AND GRASS OR STRAW MATERIALS STORED IN SILOS

BACKGROUND OF THE INVENTION

The invention concerns a wagon particularly suitable for cutting and mixing long-fiber materials, as for example fodder or grass or straw stored in silos or packed in bales or at their natural state.

Commonly known wagons are generally constituted by a container, within which there are one or more rotating endless screws, some positioned in the lower part of the container and some in its upper part.

Said commonly known wagons are suitable to perform the cutting and mixing especially of short-fiber materials, and have great difficulties in cutting long-fiber materials, especially in large quantities, as fodder or grass and straw stored in silos.

In fact during the cutting and mixing of long-fiber materials, the endless screws located in the upper part are subject to easily become obstructed because the material gets entangled around them, thereby hindering and even blocking their rotation. In some cases this can go as far as to bend the endless screw.

The same problem, also if with less intensity, is found even in the lower endless-screws.

SUMMARY OF THE INVENTION

It is in order to overcome this difficulty that we disclose this improved wagon for cutting, mixing and dispensing according to the invention, which has the main purpose of preventing, during the cutting and mixing phase, the accumulation of material between the endless-screws and the walls of the container with all the problems deriving therefrom.

The described purpose is reached through the realization of a improved wagon with cutting, mixing and dispensing functions, particularly suitable for the cutting and mixing of fodder, grass or straw stored in silos, that according to the main claim includes:

- a container on wheels, provided with a hitch for the coupling it to a trailing vehicle, with at least one port for the introduction of the material to be treated and with at least one trapdoor to discharge the treated material;
- at least two rotary endless screws, positioned at the bottom of the container, each one being lodged inside a curved-profile compartment obtained at the bottom of said compartment, whereby the endless screws are parallel and each equipped with at least a pair of spirals, one of them wound in a clockwise direction and the other one in a counter-clockwise direction beginning from the ends of the endless-screws and such as to lead the treated material towards the central part of each endless-screw, whereby each of them presents a number of cutters protruding from the external edge of the spirals that are present on the endless screw, and the wagon is characterized in that each of the endless screws presents, in the zone of convergence of the spirals, at least one baffle plate in the orthogonal position in relation to the lengthwise axis of said endless screw.

According to a preferred embodiment of the invention, said baffle plate, which is equipped with cutters protruding from its peripheral part, presents tapered lateral surfaces in order to obtain a better conveyance of the material.

Moreover, from both sides of the baffle plate, a counter-spiral branches off, with an opposite winding direction with respect to the adjoining spiral, and this counter-spiral is found above the corresponding tapered side-surface of the baffle plate. The end of the counter-spiral is jointed to the terminal part of the spiral by means of a dividing sector in a radial position with respect to the endless screw and similarly a further dividing sector, also in a radial position with respect to the endless screw, connects the end of the spiral to the tapered side-surface of the baffle plate.

At the bottom of the container and parallel to each endless screw, there is an adjustable-position blade, preferably a saw-toothed one, the teeth of which cooperate with the cutters and with the spirals forming the endless screws, realizing the cutting function and preventing the material from getting entangled around the endless screws. Moreover, within the container, on one of the walls and in correspondence with the central zone of the screws, there is a trapdoor for the discharge of the treated material, while on the essentially vertical wall opposite the trapdoor is positioned a deflector which has the purpose of constantly and continuously conveying the material above the screws, thereby favoring the mixing and avoiding any stoppage.

At the bottom of the container the curved-profile compartments where the endless screws are housed, communicate with one another through a port made in the central wall that separates them, just in front of the trapdoor. Advantageously, the wagon of the invention offers a more reliable performance as compared to the wagons of the known type.

BRIEF DESCRIPTION OF THE DRAWINGS

Further scope of applicability of the present invention will become apparent from the detailed description given hereinafter. However, it should be understood that the detailed description and specific example, while indicating a preferred embodiment of the invention, are given by way of illustration only, since various changes and modifications within the spirit and scope of the invention will become apparent to those skilled in the art from this detailed description and from the drawings, wherein.

DESCRIPTION OF THE PREFERRED EMBODIMENT

Figure 1:
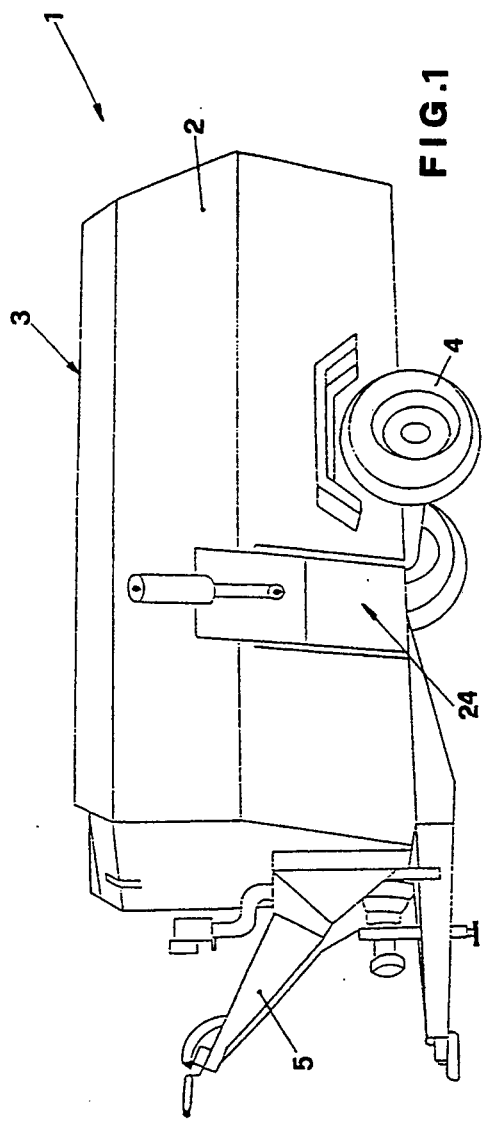
FIG. 1 shows the improved wagon of the invention in an axonometric representation.
Figure 2:
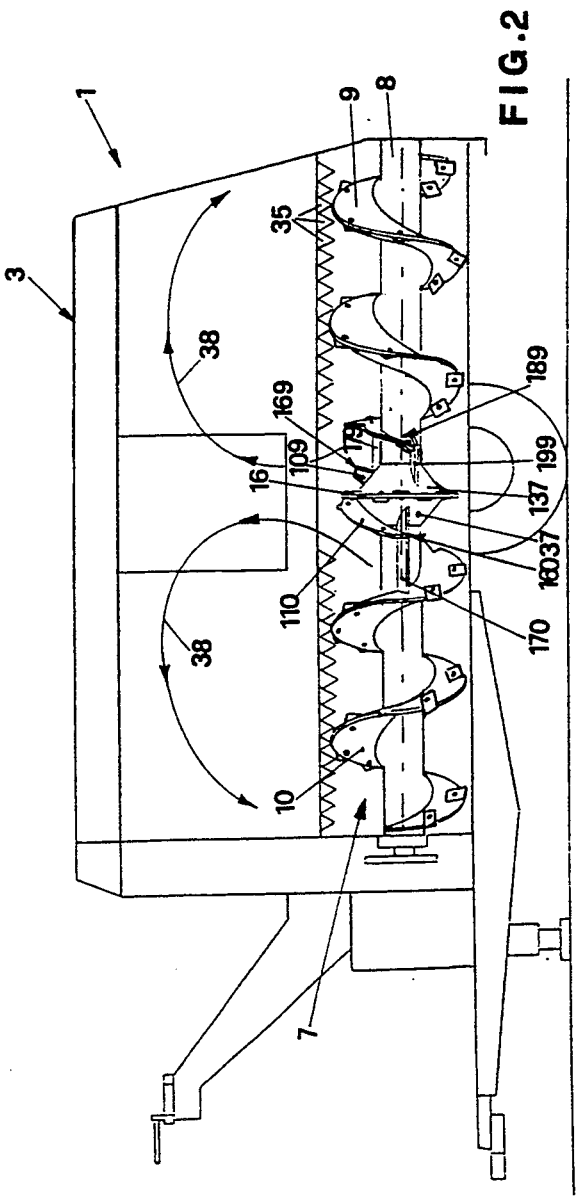
FIG. 2 shows the wagon of the invention in a lengthwise section.

As shown in the FIGS. 1 and 2, the improved wagon of the invention, indicated as a whole with 1, is constituted by a container 2 supported by wheels 4 and said container in the front side presents a hitch 5 in order to be coupled to any trailing vehicle, and in the upper side presents a charging mouth 3 for the material to be treated.

Figure 3:
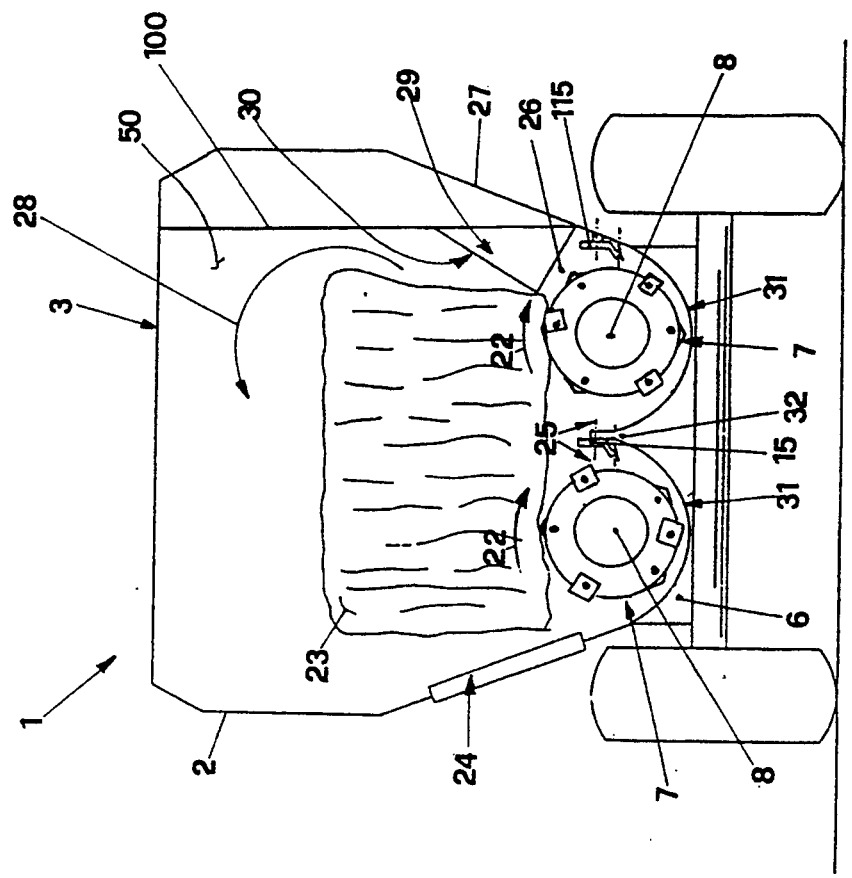
FIG. 3 shows the improved wagon in its transversal section.
Figure 4:
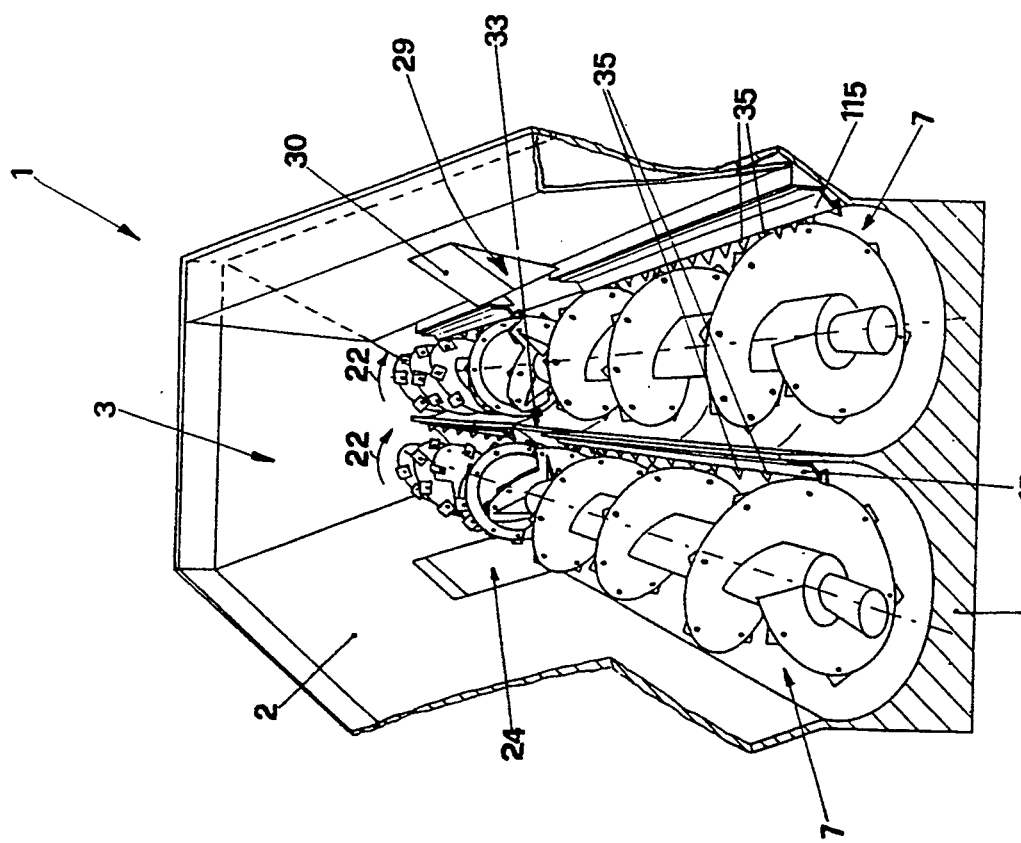
FIG. 4 shows the improved wagon of the invention in an axonometric representation with a view of the endless screws.
Figure 5:
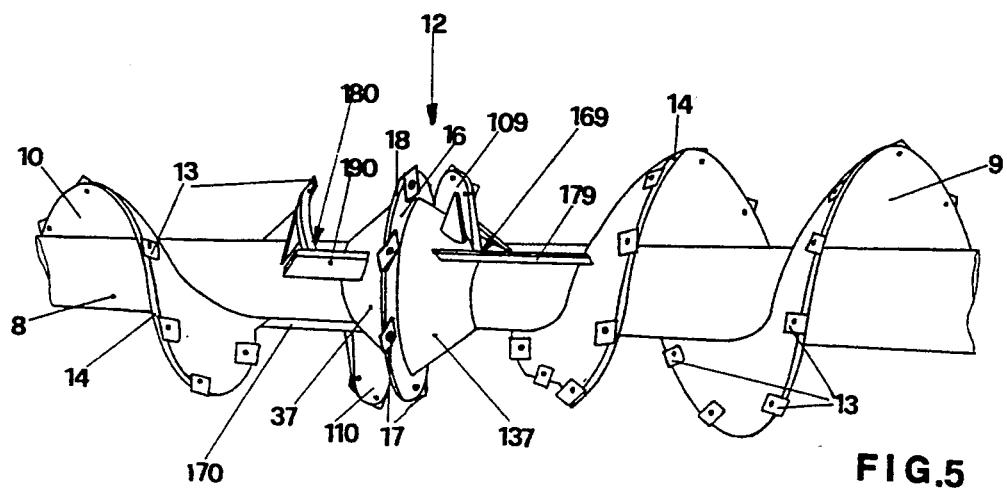
FIG. 5 shows in an axonometric view one of the endless screws of the wagon.

The container is preferably realized with sheet-metal and, as showed in the FIGS. 3 and 4, just above its bottom 6 a pair of endless screws 7 is located, and each of them, as showed in FIG. 5, is formed by a central core 8 around which two spirals 9 and 10 are wound opposite to one another. Particularly, spiral 9 is wound in a counter-clockwise direction while spiral 10 is wound in a clockwise direction so that, starting from the two ends of the central core 8, they have a convergent movement towards the central part 12 of the endless screw to which they belong. Each of said spirals presents also peripherally a number of blades 13 fixed so that they protrude out of the external edges 14 of said spirals.

Figure 6:
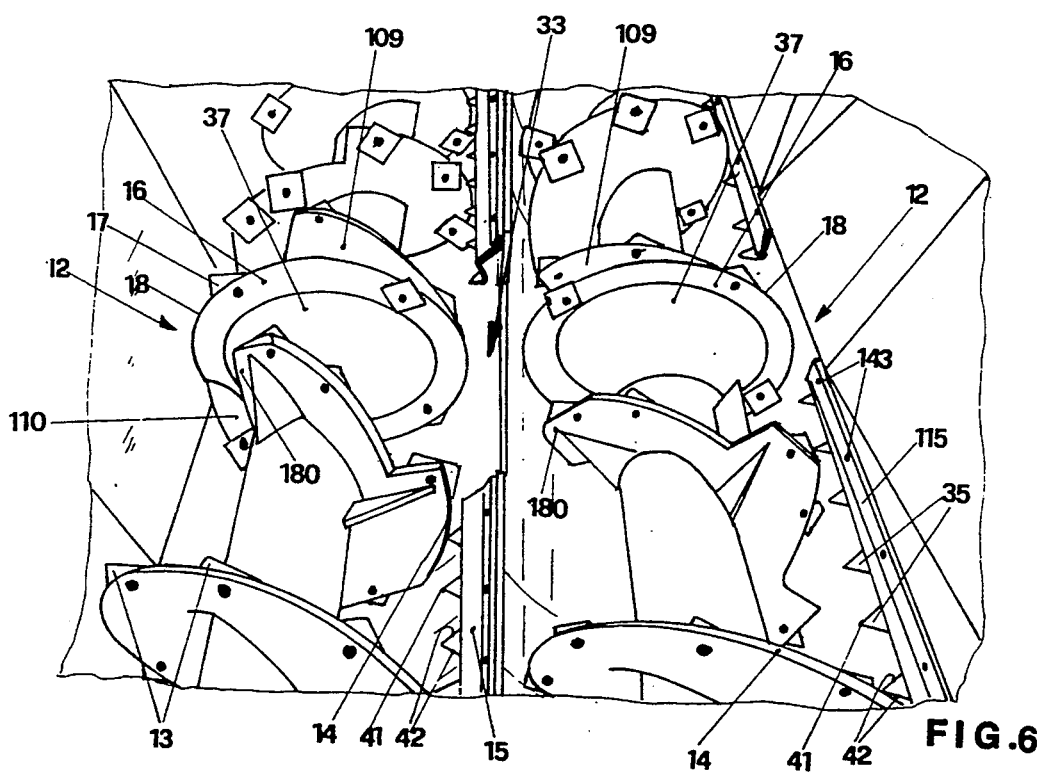
FIG. 6 shows in an axonometric view the detail of the central part of the wagon endless screws.

At the bottom of the container are also located saw-toothed blades 15 and 115 shown in FIG. 6, each presenting a number of teeth 35 and located in the lengthwise direction parallel to the endless screw.

The function of said saw-toothed blades 15 and 115 and particularly of their teeth 35, is fundamental to achieve the cutting of the material and to prevent said material from getting entangled around the endless-screws. In fact, with reference to FIG. 6, during the rotation of the screws, the tip 41 of each tooth 35 grazes the external edge 14 of the spirals 9 and 10, thus preventing the material from getting entangled around the endless screws. At the same time the sides 42 of each tooth 35 graze the blades 13, thus cutting of the material.

Figure 8:
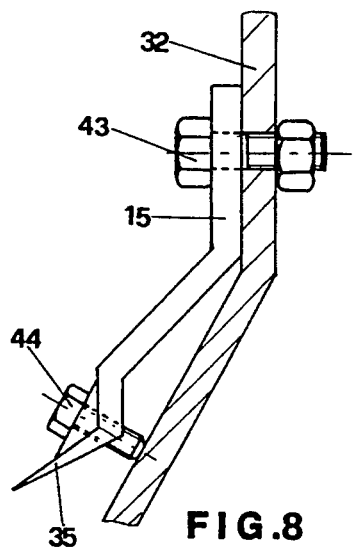
FIG. 8 shows the detail of the saw-toothed blade positioned in the internal part of the container.
Figure 9:
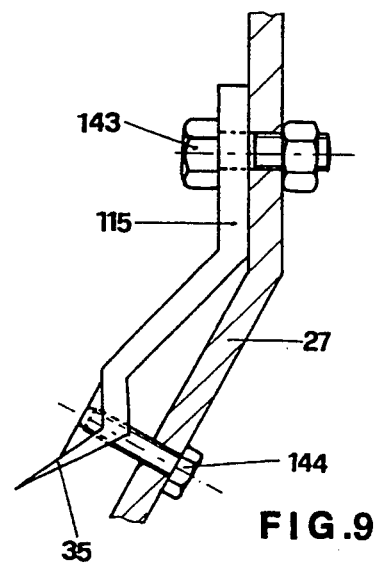
FIG. 9 shows the detail of the saw-toothed blade positioned along the wall of the container.

The position of the teeth 35 in relation to their respective endless screw 7 is adjustable by shifting the blades to which the teeth 35 belong. Said shifting occurs by pressing the blades by exploiting the elasticity of the material constituting the blades and the teeth. In fact it can be observed in the FIGS. 3, 6 and also in the detailed FIGS. 8 and 9 that the blades 115 and 15 have an adjustable position due to the pressure of the adjustment screws 144 and 44 respectively. In particular , as is shown in FIG. 9, the blade 115 is fixed to the side-wall 27 of the container 2 by means of a number of screws 143 and the position of its teeth 35 is set by adjusting from the outside of the container 2 the screwing of the screws 144 fixed to the side-wall 27, while said screws force said blade 115. In a similar way the blade 15 is fixed to the central wall 32 by screws 43 and the position of its teeth 35 is set by adjusting, from the outside of container 2, the degree of tightening of the screw 44 fixed to blade 15 which pushes against said central wall 32.

Figure 7:
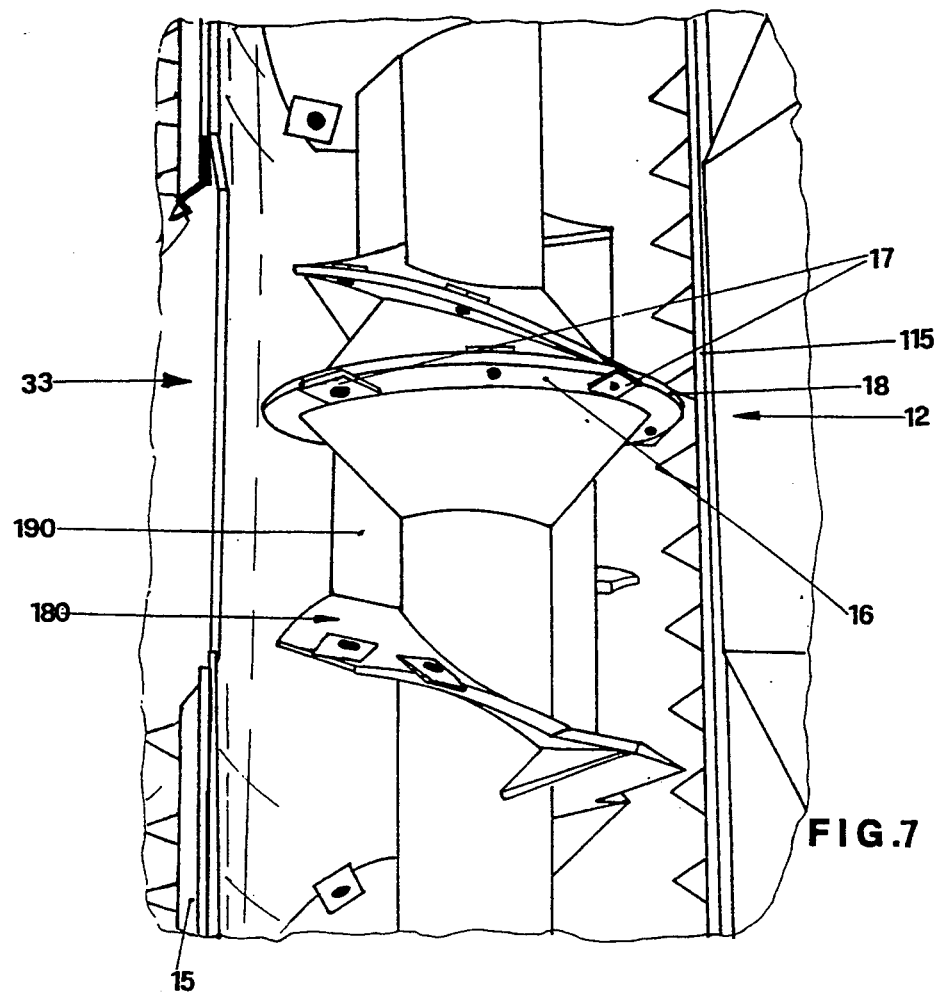
FIG. 7 shows the detail of the central part of one of the endless screws.

Each endless screw 7, as is shown in the FIGS. 6 and 7, presents in the central zone 12 a circular-shaped baffle 16, the side-surfaces of which present each a tapered section 37 and 137 respectively which are positioned with their major base adhering to the disk. Said surfaces 37 and 137 with their tapered section favor the turning of the material which, as shown in FIG. 2, is continuously conveyed upwards in the direction indicated by the arrow 38, thereby favoring a better mixing and avoiding accumulations.

Moreover from each side of the baffle 16 a counter-spiral branches off, its winding direction being opposite to the spiral adjoining the baffle, and said counter-spiral is realized on the corresponding tapered section surface of the baffle.

This is particularly evident in the FIGS. 2 and 5 where it is shown that from the baffle 16, on the side of spiral 9, a counter-spiral 109 branches off, and similarly on the side of spiral 10 a counter-spiral 110, each one presenting, as said, an opposite winding direction in relation to its respective spiral. Said counter-spirals, positioned with a staggering of 180 degrees between them on the two sides of the baffle 16, may, in a different embodiment of the invention, be more than one in number and positioned at a different angle between them.

The function of said counter-spirals is also to facilitate the mixing of the material and to avoid accumulations.

Furthermore, the end of each counter-spiral is connected to its respective spiral, and similarly the end of each spiral is connected to its respective tapered-section surface of the baffle, both with a dividing sector constituted by a blade in a radial position in relation to the endless-screw and in a parallel direction to the axis of said endless-screw. So particularly in FIG. 2 it can be observed that the end 169 of the counter-spiral 109 is connected to spiral 9 by means of a dividing sector 179, while the end 189 of spiral 9 is connected to the tapered surface 137 of the baffle 16 by means of another dividing sector 199.

Similarly the end 160 of the counter-spiral 110 is connected to spiral 10 by means of a dividing sector 170 while the end 180 of spiral 10, shown in the FIGS. 5, 6 and 7, is connected to the tapered section surface 37 of the baffle 16 by means of yet another dividing sector 190.

Moreover, preferably but not necessarily, to the baffle 16 are fixed some blades 17 protruding from its external edge 18.

The material to be processed, in this case a bale 23, as shown in FIG. 3, is laid upon the endless-screws 7 that are to rotate in the clockwise direction 22. During the rotation of the endless-screws, the bale 23 is flaked by the action of the blades 13.

Said flaked material is simultaneously cut by means of the grazing action of the blades 13 on the sides 42 of the teeth 35 of the fixed saw-toothed blades 15 and 115 as already described. Moreover, simultaneously, it undergoes a mixing process because of the axial-movement caused by the spirals 9 and 10, set opposite to one another, which, during the rotation of each endless-screw 7, push the material towards the central part 12 of each spiral.

When the material reaches said central part 12 of each endless screw 7 where the baffle 16 is located, the tapered surfaces 37 and 137 of said baffle 16 lead it upwards in direction 38, thereby avoiding accumulations. As can be seen in FIGS. 3 and 4, in front of the trapdoor 24 an essentially vertical wall 100 is placed which is spaced from the lateral wall 27 defining the external surface of the container 2. Moreover, to said essentially vertical wall 100 a deflector 29 is applied, the upper surface 30 of which is inclined with a divergence towards the outside of the container. The wagon has, therefore, an inner asymmetrical shape which, when the screws rotate in the clockwise direction indicated with the arrow 22, facilitates the conveyance of the material against the inclined surface 30 of the deflector 29 and against the essentially vertical wall 100, which cause the turning of the material according to direction 28. This allows the movement of the material under treatment also in the zone 50 of the container visible in FIG. 3, where it would otherwise remain practically still. Furthermore, the presence of said deflector 29 reduces also the power needed to cut the material, because it prevents the material from accumulating in position 26 contained between the endless-screw and the wall 27 of the container 2.

To avoid the accumulation of material also in the central zones 25 of the container and furthermore also to facilitate the discharging of material at the end of the treatment through the discharge trapdoor 24, the curved-profile compartments 31 within which the endless screws 7 are positioned, in their central wall 32 present a port 33 that, as shown in the FIGS. 6 and 7, is realized near the central part 12 of the endless screws.

This port facilitates the circulation of the material from one endless screw to the other and simplifies its discharge through the trapdoor 24.

By this description it is thus comprehensible that the material within container 2 is first cut and subsequently transported by means of the spirals 9 and 10 of the endless screws 7 without the risk of stoppage or, even worse, of the breaking-down of said screws. It has been noted in fact that due to the presence of the deflector 29, of the essentially vertical wall 100 on which the deflector is applied, of the baffle 16 with its tapered-section surfaces 137 and 37, and also of the counter-spirals 109 and 110, the material under treatment is kept in constant movement. The presence moreover of the port 33 which allows the communication between the compartments 31 within which the endless screws 7 are housed, favors the discharge of the cut and mixed material through the trapdoor 24. Therefore, in the wagon of the invention provided with the described improvements, a blockage while in operation is avoided, so that the operations of cutting and mixing of the material take place with great reliability. During the realization phase some construction modifications to the wagon of the invention may be performed, which modifications may consist e.g. of the realization of the spirals in each endless screw with many beginnings or with variable or not constant pitch. Furthermore even more baffles can be mounted in each endless screw.

It is understood however that all said variations are protected by the present invention.

We claim:

1. A cutting, mixing and dispensing wagon, particularly suitable for the cutting and mixing of fodder, of straw or grass stored in silos, comprising:
   a container supported by wheels, provided with a hitch for the coupling with a trailing vehicle, with at least one mouth for the introduction of the material to be treated and with at least one trapdoor for the discharge of the treated material;
   at least two rotatable endless-screws housed each within a corresponding curved-profile compartment, formed at the bottom of said container, positioned parallel to one another and both provided with a pair of spirals, each spiral beginning at opposite ends of each screw, one wound in clockwise and the other in counter-clockwise direction starting from its extremity, in order to convey the treated material toward a convergence zone near the central part of each endless screw;
   each of said screws presenting in addition a number of blades fixed so that they protrude from the external edge of the spirals forming it; each of said screws presents in the convergence zone of the spirals baffle means positioned orthogonal to the lengthwise axis of said screw.

2. A wagon according to claim 1, wherein each baffle means comprises a circular shape disk having said-surfaces, each side-surface having a tapered section being positioned with its major base in abutment with said side surface.

3. A wagon according to claim 1, wherein each baffle means is provided on its peripheral edge with blades.

4. A wagon according to claim 1, wherein each spiral has a terminal side near the central part of each endless screw further including a counter-spiral positioned between the baffle means and each terminal side having an opposite winding direction with respect to the corresponding spiral, and said counter-spiral is fixed to the baffle means on one side and to the terminal side of the corresponding spiral on the other side, by means of a dividing sector positioned on the endless screw, and in a parallel direction to the axis of said screw.

5. A wagon according to claim 1, further including for each endless screw at least one dividing sector positioned between each spiral and the baffle means in a parallel direction to the axis of said screw.

6. A wagon according to claim 1, wherein a saw-toothed blade is positioned over each endless screw.

7. A wagon according to claim 6, wherein the position of each saw tooth blade is adjustable in relation to its respective endless screw by means of screws.

8. A wagon according to claim 6, wherein each saw tooth blade is provided with teeth that cooperate simultaneously with the blades associated with the corresponding spirals and with the external edge of said endless screw, thereby performing the cutting of the material and preventing it form getting entangled around said endless screw.

9. A wagon according to claim 1, wherein the container includes laterally disposed upstanding first and second wall portions, said first wall portion being disposed in a generally vertical direction and said second wall portion being disposed at an angle relative thereto forming an asymmetrical shape for said container; a deflector applied to said first wall portion, the deflector being provided with an upper surface inclined outwardly of the container relative to the first wall portion, and said trapdoor being disposed in said second wall portion, said first wall portion and said deflector favoring the turning of material when the endless screws rotate in a clockwise direction.

10. A wagon according to claim 1, wherein the curved profile compartments within which the endless screws are housed, present in a central wall a port to communicate between them, and said port is positioned in correspondence with the central part of the endless screws and in front of the discharge trapdoor.

* * * * *